United States Patent [19]

Saccone et al.

[11] Patent Number: 5,673,934
[45] Date of Patent: Oct. 7, 1997

[54] PRESSURE VESSEL WITH RUPTURABLE CLOSURE WALL

[75] Inventors: Paul T. Saccone, Rochester Hills; Pongdet P. Wipasuramonton, Rochester, both of Mich.

[73] Assignee: TRW Vehicle Safety Systems Inc., Lyndhurst, Ohio

[21] Appl. No.: 412,075

[22] Filed: Mar. 28, 1995

[51] Int. Cl.$^6$ .................................. B60R 21/26
[52] U.S. Cl. .................. 280/737; 280/741; 280/736; 222/3
[58] Field of Search ................ 280/741, 737, 280/736; 222/3, 5; 102/530, 531; 422/164

[56] References Cited

U.S. PATENT DOCUMENTS

| | | |
|---|---|---|
| 3,567,245 | 3/1971 | Ekstrom . |
| 3,788,667 | 1/1974 | Vancil .................... 280/737 |
| 3,834,412 | 9/1974 | Fannin . |
| 3,865,273 | 2/1975 | Zeigler . |
| 3,961,806 | 6/1976 | Katter .................... 280/732 |
| 4,006,919 | 2/1977 | Neuman . |
| 4,146,047 | 3/1979 | Wood et al. .................... 137/68 |
| 4,576,303 | 3/1986 | Mundt et al. .................... 220/89 |
| 5,195,777 | 3/1993 | Cuevas . |
| 5,226,561 | 7/1993 | Hamilton et al. . |
| 5,348,344 | 9/1994 | Blumenthal et al. . |
| 5,350,192 | 9/1994 | Blumenthal .................... 222/5 X |
| 5,356,176 | 10/1994 | Wells .................... 280/737 |
| 5,364,127 | 11/1994 | Cuevas .................... 222/3 X |
| 5,460,406 | 10/1995 | Faigle .................... 280/741 |
| 5,464,247 | 11/1995 | Rizzi et al. .................... 280/737 |
| 5,536,040 | 7/1996 | Cuevas et al. .................... 280/737 |
| 5,555,741 | 9/1996 | Oakley .................... 222/5 X |

*Primary Examiner*—Christopher P. Ellis
*Attorney, Agent, or Firm*—Tarolli, Sundheim, Covell, Tummino & Szabo

[57] ABSTRACT

A pressure vessel (10) includes a tank (12) and a closure cap (14) for closing the tank (12). The closure cap (14) is a unitary part made entirely of a homogeneous material. The unitary part (14) includes a rupturable closure wall (20) which, when ruptured, permits fluid to flow outward from the tank (12). The closure wall (20) has an arcuate cross sectional shape. The unitary part (14) also functions as a conduit for directing fluid to flow outward from the closure wall (20) when the closure wall (20) is ruptured.

16 Claims, 3 Drawing Sheets

PRESSURE VESSEL WITH RUPTURABLE CLOSURE WALL

FIELD OF THE INVENTION

The present invention relates to a pressure vessel for containing fluid under pressure, and particularly relates to a pressure vessel with a rupturable closure wall.

BACKGROUND OF THE INVENTION

A pressure vessel for containing fluid under pressure may include a tank, a closure cap, and a rupturable closure wall. In such a pressure vessel, the closure wall is fixed and sealed to the closure cap. The closure cap is fixed and sealed to an outlet end of the tank to close the tank. The closure cap thus supports the closure wall in a position in which the closure wall blocks the fluid from flowing outward from the tank. Additionally, the closure cap is constructed as a manifold with a plurality of fluid outlet openings.

When the fluid is to be released from the pressure vessel, the closure wall is ruptured. As known in the art, the closure wall may be ruptured by fluid pressure forces acting outward against the closure wall, or by the impact of a piston or the like. The fluid then flows outward past the closure wall and into the closure cap, and further outward from the pressure vessel through the outlet openings in the closure cap.

A pressure vessel of the foregoing type is commonly used to contain inflation fluid for inflating an inflatable device. For example, the pressure vessel may be used to contain inflation fluid for inflating an air bag which protects a vehicle occupant upon the occurrence of a vehicle collision. In such a pressure vessel, the closure wall typically is a dome-shaped metal disk which is welded to the closure cap.

SUMMARY OF THE INVENTION

In accordance with the present invention, a pressure vessel comprises tank means for containing fluid under pressure, and also comprises a unitary part made entirely of a homogeneous material. The unitary part includes a rupturable closure wall which, when ruptured, permits fluid to flow outward from the tank means. The closure wall has an arcuate cross sectional shape. The unitary part further includes conduit means for directing fluid to flow outward from the closure wall when the closure wall is ruptured.

In a preferred embodiment of the present invention, the tank means has a tubular neck centered on an axis. The unitary part is a closure cap, and is formed entirely of a ductile metal material with an elongation of at least 8 percent. The closure cap has a tubular neck received coaxially within the tubular neck of the tank means. The closure wall is located at an axially inner end of the neck of the closure cap. Since the closure cap is formed entirely of the ductile metal material, the closure wall is an integral portion of the closure cap which is not welded to another part of the closure cap. A cylindrical inner surface of the neck surrounds the closure wall, and defines a fluid flow passage extending axially outward from the closure wall.

In the preferred embodiment of the present invention, the closure wall has a dome-shaped portion with a convex outer side surface centered on the axis. A plurality of score lines extend across the dome-shaped portion. The score lines define sections of the closure wall which are separated and deflected outward from each other as petals when the closure wall is ruptured. The closure wall further has an annular peripheral portion. The peripheral portion defines a narrow annular fillet which is located radially between the dome-shaped portion of the closure wall and the surrounding neck of the closure cap.

The fillet at the periphery of the closure wall is designed specifically to prevent the petals from being severed from the closure wall when they are separated and deflected outward from each other. In accordance with this feature of the present invention, the fillet has a concave outer side surface extending circumferentially around the dome-shaped portion of the closure wall. The concave fillet surface extends radially outward from the dome-shaped portion of the closure wall to the neck of the closure cap. The contour of the concave fillet surface is tangent to the contour of the convex surface on the dome-shaped portion of the closure wall. The contour of the concave fillet surface is also tangent to the contour of the surrounding cylindrical surface on the neck. The ductile metal material of the closure cap thus extends radially outward across the fillet from the dome-shaped portion of the closure wall to the surrounding neck without having a corner or other sharply turned edge. As a result, the fillet most effectively distributes and withstands the bending stresses caused by outward deflection of the petals, whereas a corner in the structure of the fillet could cause a concentration of the bending stresses which could, in turn, cause the ductile metal material to break. The structure and material of the closure wall thus prevent the petals from being separated from the closure wall when the closure wall is ruptured.

BRIEF DESCRIPTION OF THE DRAWINGS

Further features of the present invention will become apparent to those skilled in the art to which the present invention relates from reading the following description with reference to the accompanying drawings, in which.

DESCRIPTION OF A PREFERRED EMBODIMENT

Figure 1:
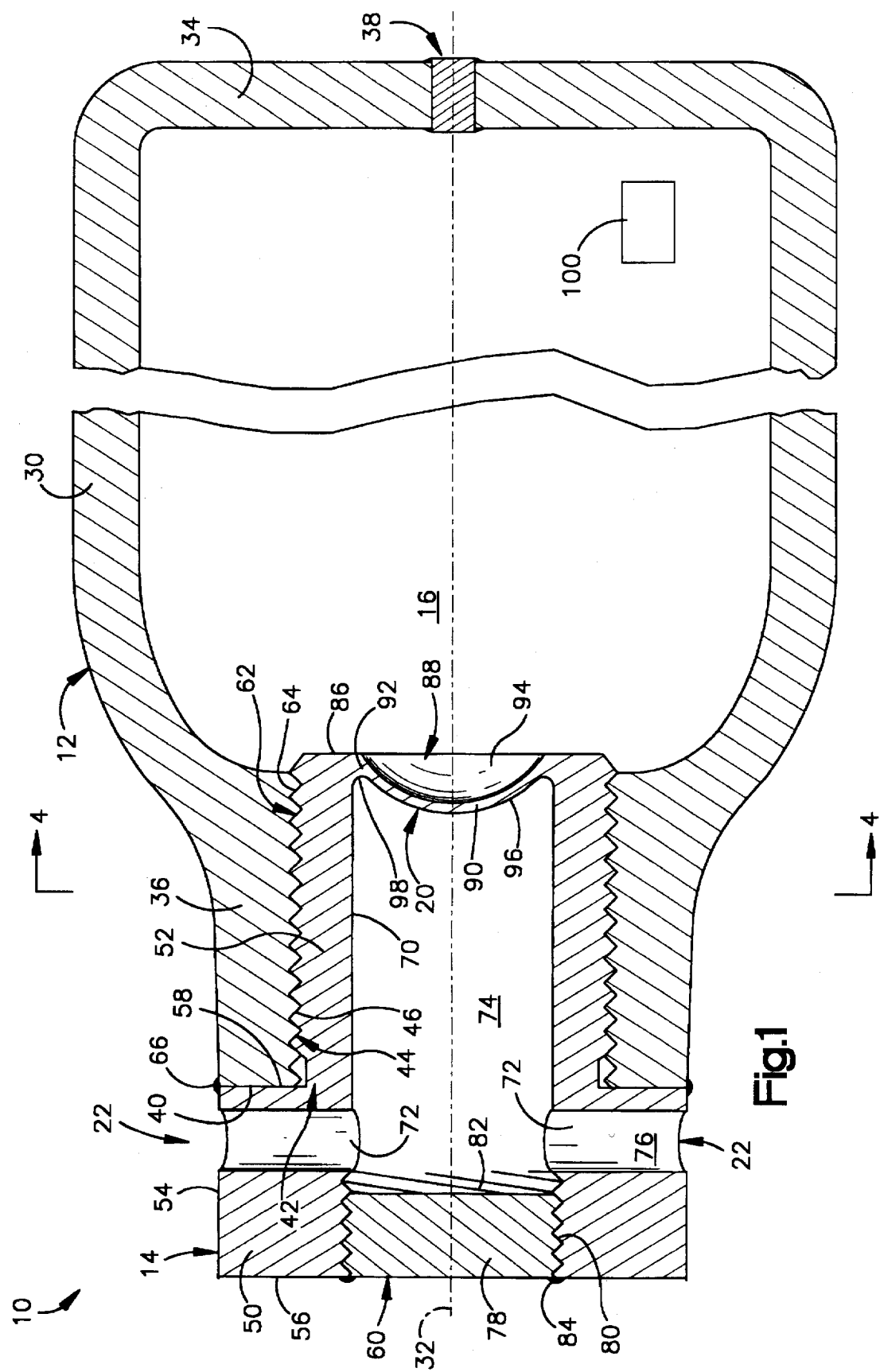
FIG. 1 is a view of an apparatus comprising a pressure vessel constructed in accordance with the present invention.
Figure 2:
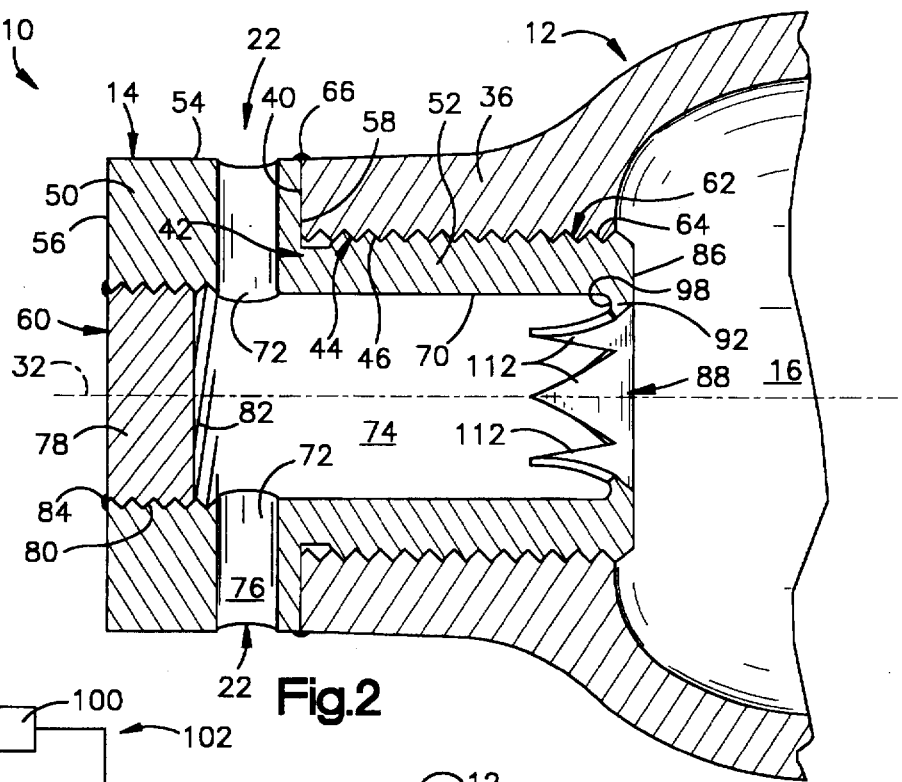
FIG. 2 is a partial view of the apparatus of FIG. 1 showing the pressure vessel in an opened condition.

A pressure vessel 10 comprising a preferred embodiment of the present invention is shown in FIG. 1. The pressure vessel 10 includes a tank 12, which is sometimes referred to as a bottle, and a closure cap 14 which closes the tank 12. The tank 12 has a storage chamber 16 containing fluid under pressure. The closure cap 14 has a rupturable closure wall 20. When the pressure vessel 10 is closed, as shown in FIG. 1, the fluid is blocked from flowing out of the storage chamber 16 by the closure wall 20. When the pressure vessel 10 is opened, as shown in FIG. 2, the closure wall 20 is ruptured and the fluid is released to flow out of the storage chamber 16 past the closure wall 20. The fluid then flows outward through the closure cap 14 and further outward from the pressure vessel 10 through a plurality of outlet openings 22 in the closure cap 14.

The tank 12 has an elongated cylindrical body wall 30 with a longitudinal central axis 32. The tank 12 further has a circular end wall 34 at one end of the body wall 30 and a tapered, tubular neck 36 at the opposite end of the body wall 30. An inlet opening 38 at the center of the end wall 34 is closed and sealed in a known manner when the storage chamber 16 has been filled with the fluid at a desired pressure. An annular end surface 40 of the neck 36 defines a circular tank opening 42 which is centered on the axis 32. A cylindrical inner surface 44 of the neck 36 extends axially inward from the tank opening 42 to the storage chamber 16, and has a screw thread 46. The tank 12 is preferably formed of an aluminum alloy, but may be formed of any other suitable material known in the art.

The closure cap 14 is a unitary part made entirely of a homogeneous material. The homogeneous material in the preferred embodiment of the present invention is a ductile metal with an elongation of at least 8 percent. An aluminum alloy is most preferable, but other such ductile metals also could be used. Since the closure cap 14 is constructed as a unitary part made entirely of a homogeneous material, the closure wall 20 is not a separate part. Instead, the closure wall 20 is an integral portion of the closure cap 14 which is made entirely of the same homogeneous material. Other integral portions of the closure cap 14 include a head 50 and a neck 52. The closure wall 20, the head 50, and the neck 52 may be constructed together as integral portions of the closure cap 14 by any suitable casting, machining and/or stamping process known in the art.

The head 50 of the closure cap 14 has a short cylindrical shape defined by a cylindrical outer surface 54 and a pair of annular opposite side surfaces 56 and 58. The outer side surface 56 of the head 50 defines a circular cap opening 60 which is centered on the axis 32. The inner side surface 58 of the head 50 abuts the outer end surface 40 on the neck 36 of the tank 12.

The neck 52 of the closure cap 14 has a reduced diameter, elongated cylindrical shape projecting axially inward from the inner side surface 58 of the head 50. A cylindrical outer surface 62 of the neck 52 has a screw thread 64 engaged with the screw thread 46 on the neck 36 of the tank 12. Accordingly, the closure cap 14 is installed in the position of FIG. 1 by screwing the neck 52 of the closure cap 14 into the neck 36 of the tank 12 until the inner side surface 58 on the closure cap 14 moves against the outer end surface 40 on the tank 12. When the closure cap 14 is thus engaged with the tank 12, a weld 66 is formed around the adjoining peripheries of the abutting surfaces 40 and 58 to fix and seal the closure cap 14 to the tank 12. Alternatively, a seal between the closure cap 14 and the tank 12 could be formed in any other suitable manner known in the art.

In addition to closing the tank 12, the closure cap 14 functions as a manifold for directing the fluid to flow outward from the pressure vessel 10, as described briefly above. The closure cap 14 thus has a plurality of inner surfaces for defining conduits which extend from the closure wall 20 to the outlet openings 22. These include a first cylindrical inner surface 70 and a plurality of smaller, additional cylindrical inner surfaces 72. The first cylindrical inner surface 70 is centered on the axis 32, and extends axially outward from the closure wall 20 at the inner end of the neck 52 to the cap opening 60 at the outer side surface 56 of the head 50. Each of the additional cylindrical inner surfaces 72 extends radially outward through the head 50 from the first cylindrical inner surface 70 to a corresponding one of the outlet openings 22 at the outer surface 54. The closure cap 14 thus has a first cylindrical conduit 74 extending axially outward through the neck 52 from the closure wall 20 to the head 50, and has a plurality of additional, smaller cylindrical conduits 76 extending radially outward through the head 50 to the outlet openings 22.

A short cylindrical closure plug 78 has an outer screw thread 80 engaged with an inner screw thread 82 on the first cylindrical inner surface 70. The closure plug 78 thus defines the outer end of the first conduit 74, and also closes the cap opening 60. A circumferentially extending weld 84 like the weld 66 fixes and seals the closure plug 78 to the closure cap 14.

The closure cap 14 further has, at its end opposite the head 50, an annular inner end surface 86 which defines a circular orifice 88 centered on the axis 32. The closure wall 20 has a circular peripheral shape, and also is centered on the axis 32. More specifically, the closure wall 20 has a dome-shaped central portion 90 and an annular peripheral portion 92. The central portion 90 of the closure wall 20 has a circular peripheral shape and extends diametrically across the axis 32. The central portion 90 further has an arcuate cross sectional shape with a concave inner side surface 94 and an oppositely facing, convex outer side surface 96. The inner side surface 94 faces axially inward toward the orifice 88, and defines an axially outer boundary of the storage chamber 16.

The annular peripheral portion 92 of the closure wall 20 extends circumferentially around the central portion 90, and defines the circular peripheral shape of the closure wall 20. The peripheral portion 92 of the closure wall 20 is thus constructed as a narrow annular fillet which is located radially between the central portion 90 of the closure wall 20 and the neck 52 of the closure cap 14. A concave outer side surface 98 of the fillet 92 extends around the entire circumference of the convex outer side surface 96 on the central portion 90 of the closure wall 20. The concave surface 98 of the fillet 92 further extends radially outward from the convex surface 96 on the central portion 90 to the first cylindrical inner surface 70 on the neck 52.

The fluid contained under pressure in the storage chamber 16 may comprise, for example, an inflation fluid for inflating an inflatable device. In the preferred embodiment of the present invention shown in the drawings, the fluid comprises an inflation fluid for inflating an inflatable vehicle occupant restraint (not shown) which is commonly referred to as an air bag. Specifically, the inflation fluid comprises a combustible mixture of gases in accordance with the invention set forth in U.S. Pat. No. 5,348,344, assigned to TRW Vehicle Safety Systems Inc. The combustible mixture of gases is preferably contained in the storage chamber 16 at a storage pressure within the range of approximately 1500 psi to approximately 5000 psi. An ignitor 100 for igniting the combustible mixture of gases is associated with the pressure vessel 10.

Figure 3:
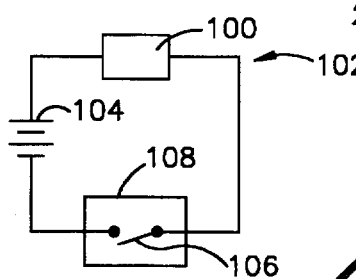
FIG. 3 is a schematic view of an electrical circuit associated with the pressure vessel of FIG. 1.

As shown schematically in FIGS. 1 and 2, the ignitor 100 in the preferred embodiment of the present invention is located in the storage chamber 16 with the combustible mixture of gases. The ignitor 100 may comprise any suitable structure known in the art, such as a squib of the type which is commonly used in air bag inflators. As shown in FIG. 3, the ignitor 100 is included in an electrical circuit 102. The electrical circuit 102 further includes a power source 104 and a normally open switch 106. The switch 106 is part of a collision sensor 108 which senses a condition indicating the occurrence of a vehicle collision. If the collision-indicating condition is above a predetermined threshold, it indicates the occurrence of a vehicle collision for which inflation of the air bag is desired to protect a vehicle occupant.

When the collision sensor 108 senses a collision-indicating condition above the predetermined threshold, the switch 106 is closed and the ignitor 100 is actuated electrically. The ignitor 100 then ignites the combustible mixture of gases in the storage chamber 16. As a result, the temperature and pressure of the combustible mixture of gases rapidly increase to elevated levels. When the pressure reaches a predetermined elevated level, the closure wall 20 ruptures under the stress induced by the pressure acting outward against the concave inner side surface 94. As described briefly above with reference to FIG. 2, the fluid is then released to flow outward from the storage chamber 16 past the closure wall 20, outward through the conduits 74 and 76 in the closure cap 14, and further outward from the pressure vessel 10 through the outlet openings 22. The inflation fluid is subsequently directed into the air bag by a known structure (not shown) such as a diffuser or a reaction canister.

Figure 4:
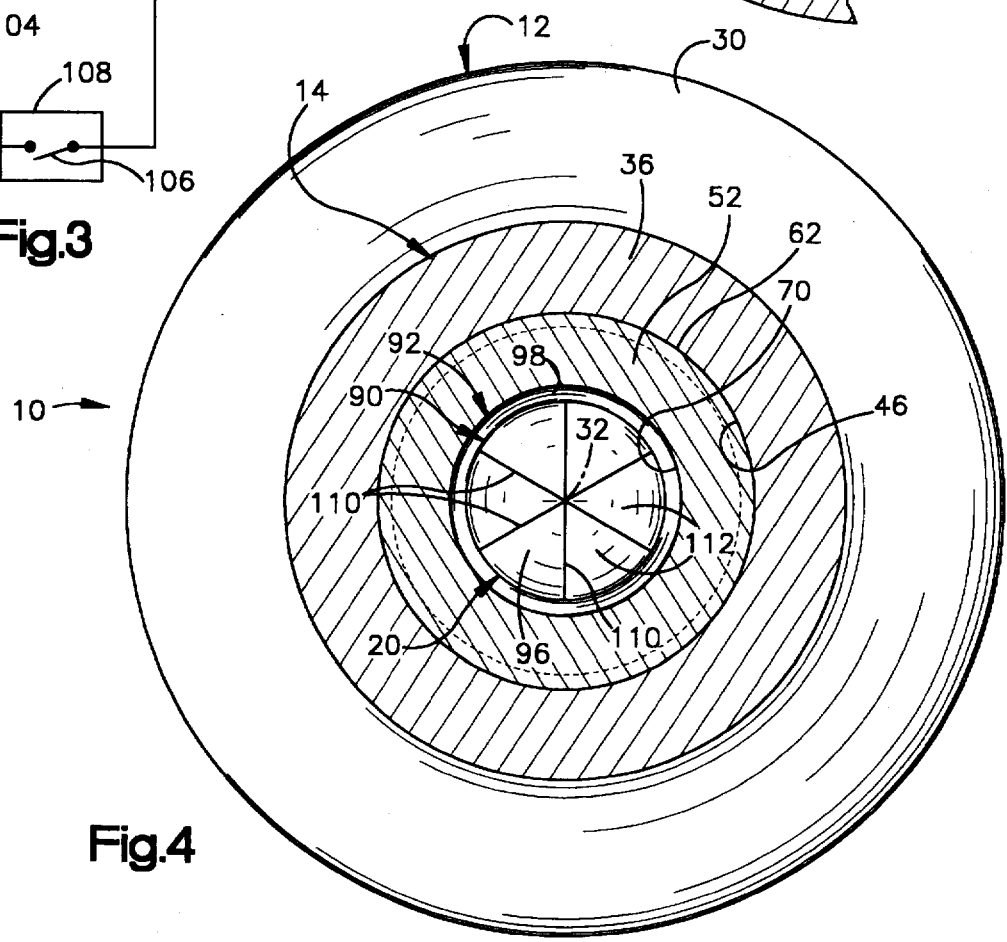
FIG. 4 is a view taken on line 4—4 of FIG. 1.

As shown in FIG. 4, the closure wall 20 has a plurality of score lines 110 extending across the dome-shaped central portion 90. The score lines 110 delineate sections of the closure wall 20. Each section has the shape of generally triangular petal 112. The score lines 110 also weaken the closure wall 20 so as to define stress risers which extend along the score lines 110 between the adjoining sides of the petals 112.

When the fluid pressure acting outward against the closure wall 20 reaches the predetermined elevated level, it causes the closure wall 20 to rupture along the stress risers defined by the score lines 110. The petals 112 then separate from each other at their adjoining sides and deflect radially and axially outward under the influence of the fluid pressure, as shown in FIG. 2. The closure wall 20 is thus ruptured in a controlled manner so that the fluid in the storage chamber 16 can flow freely outward through the orifice 88 and past the closure wall 20. Although the closure wall 20 is shown in FIG. 4 to have six score lines 110 extending radially outward from the center of the central portion 90, a different pattern of score lines could alternatively be used to define a different number and/or configuration of petals.

The closure wall 20 is designed specifically to ensure that the petals 112 are not severed from the closure wall 20 when they are separated from each other along the score lines 110. Accordingly, the fluid flowing outward through the orifice 88 will not carry a severed petal 112 to a position in which it could block the fluid from flowing freely outward through the conduits 74 and 76 in the closure cap 14. This feature of the closure wall 20 is provided primarily by the structure of the fillet 92.

Figure 5:
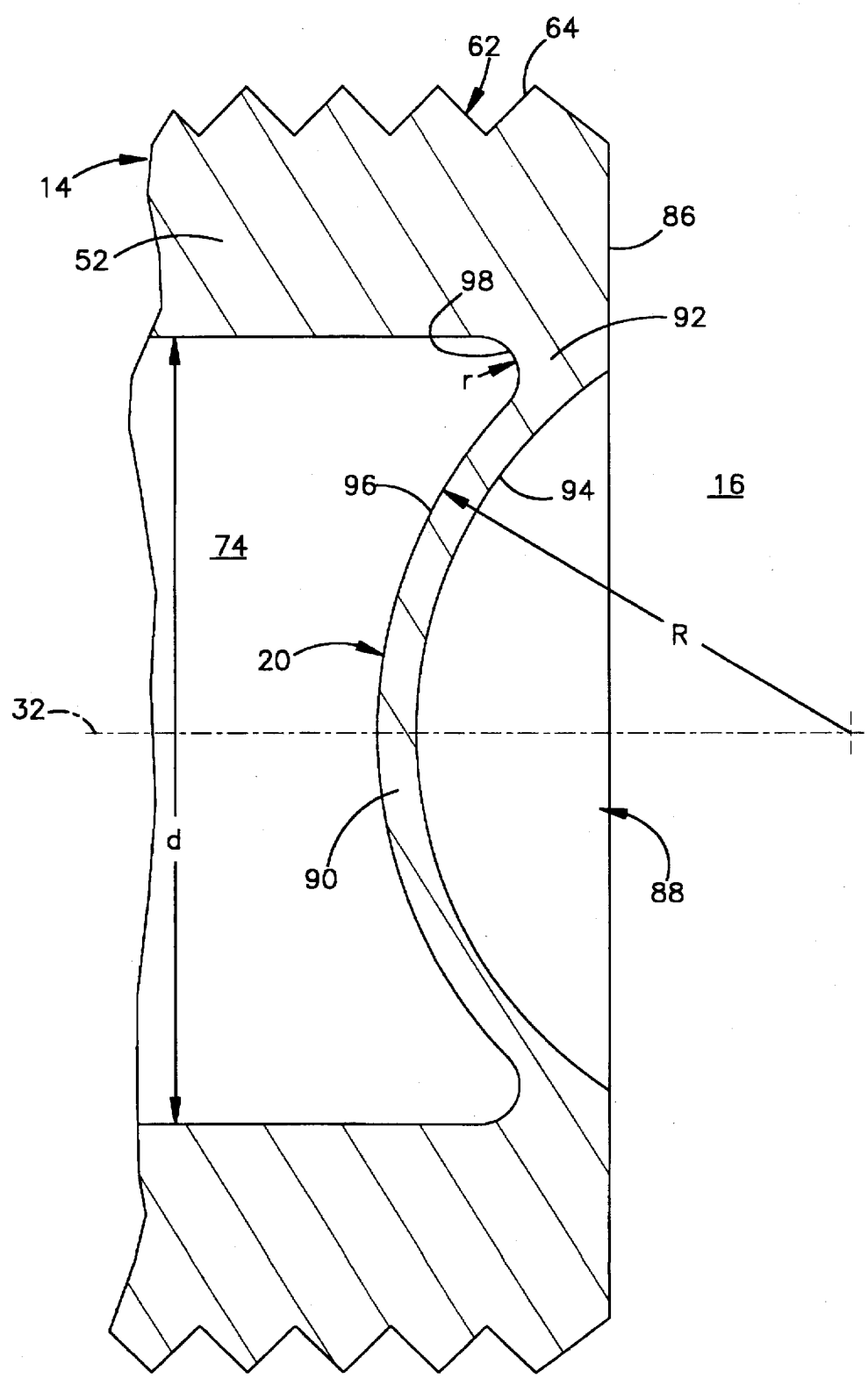
FIG. 5 is an enlarged partial view of a part shown in FIG. 1.

As shown in enlarged detail in FIG. 5, the concave surface 98 of the fillet 92 has a circular contour extending radially between the convex surface 96 and the surrounding cylindrical surface 70. The contour of the concave surface 98 thus has a constant radius r along its length between the convex surface 96 and the surrounding cylindrical surface 70. Moreover, the contour of the concave surface 98 is tangent to the contour of the convex surface 96, and is also tangent to the contour of the cylindrical surface 70, around the entire circumference of the closure wall 20. Such curvature of the concave surface 98 enables the ductile metal material at the fillet 92 to distribute and withstand bending stresses most effectively without breaking when the petals 112 deflect outward.

Other parameters relating to the structure of the closure wall 20 include the curvature of the central portion 90 and the diameter d of the conduit 74 at the outside of the central portion 90. As shown in FIG. 5, the curvature of the central portion 90 is preferably spherical. The convex outer side surface 96 thus has a constant radius R. The radius R is preferable within the range of approximately 40 to approximately 70 percent of the diameter d, and is most preferably equal to approximately 60 percent of the diameter d. The radius r of the concave surface 98 at the fillet 92 is preferably within the range of approximately 5 to approximately 10 percent of the diameter d, but can vary up to a preferred maximum value of approximately 25 percent of the diameter d.

From the above description of the present invention, those skilled in the art will perceive improvements, changes and modifications. For example, although the closure wall 20 in the preferred embodiment of the present invention is ruptured only by the force of fluid pressure in storage chamber 16, a closure wall constructed in accordance with the present invention could alternatively be ruptured in whole or in part by a piston, a projectile, or the like. Such improvements, changes and modifications within the skill of the art are intended to be covered by the appended claims.

Having described the invention, the following is claimed:

1. Apparatus comprising:
   tank means for containing fluid under pressure; and
   a unitary part made entirely of a ductile metal material having an elongation of at least 8 percent;
   said unitary part including a rupturable closure wall with a circular peripheral shape centered on an axis, a concave inner side surface centered on said axis, and a convex outer side surface centered on an axis, said closure wall having a plurality of score lines delineating sections of said closure wall which separate and deflect outward when said closure wall is ruptured;
   said unitary part further including conduit means for directing fluid to flow outward from said closure wall when said closure wall is ruptured, said conduit means having a cylindrical surface which surrounds said closure wall and which defines a cylindrical conduit extending outward from said closure wall along said axis;
   said closure wall further having an annular peripheral portion defining a fillet, said fillet having a concave outer side surface extending radially outward from said convex outer side surface to said surrounding cylindrical surface.

2. Apparatus as defined in claim 1 wherein said convex outer side surface has a first contour, said surrounding cylindrical surface having a second contour, said concave outer side surface having a third contour which is tangent to said first and second contours.

3. Apparatus as defined in claim 2 wherein said third contour has a constant radius.

4. Apparatus as defined in claim 3 wherein said constant radius is not greater than approximately 25 percent of the diameter of said surrounding cylindrical surface.

5. Apparatus as defined in claim 4 wherein said convex outer side surface is spherical with a radius within the range of approximately 40 to approximately 70 percent of the diameter of said surrounding cylindrical surface.

6. Apparatus comprising:
   tank means for containing fluid under pressure; and
   a unitary part made entirely of a homogeneous material;
   said unitary part including a rupturable closure wall, said closure wall having a circular peripheral shape centered on an axis, a concave inner side surface centered on said axis, a convex outer side surface centered on said axis, and a plurality of score lines delineating sections of said closure wall which separate and deflect outward when said closure wall is ruptured;
   said unitary part further including conduit means for directing fluid to flow outward from said closure wall when said closure wall is ruptured, said conduit means having a cylindrical surface which surrounds said closure wall and which defines a cylindrical conduit extending outward from said closure wall along said axis.

7. Apparatus as defined in claim 6 wherein said closure wall has an annular fillet portion defining the periphery of said closure wall, said fillet portion having a concave outer side surface extending radially outward from said convex outer side surface to said surrounding cylindrical surface.

8. Apparatus as defined in claim 7 wherein said convex outer side surface has a first contour, said surrounding cylindrical surface having a second contour, said concave outer side surface having a third contour which is tangent to said first and second contours.

9. Apparatus as defined in claim 8 wherein said third contour has a constant radius.

10. Apparatus as defined in claim 9 wherein said constant radius is not greater than approximately 25 percent of the diameter of said surrounding cylindrical surface.

11. Apparatus comprising:

tank means for containing fluid under pressure; and a unitary part made entirely of a homogeneous material;

said unitary part including a rupturable closure wall which, when ruptured, permits fluid to flow outward from said tank means, said closure wall having an arcuate cross sectional shape;

said unitary part further including conduit means for directing fluid to flow outward from said closure wall when said closure wall is ruptured;

said closure wall having a circular peripheral shape with a central axis, a concave inner side surface with a spherical contour centered on said axis, a convex outer side surface with a spherical contour centered on said axis, and a plurality of score lines delineating sections of said closure wall which separate and deflect outward when said closure wall is ruptured;

said conduit means having a cylindrical surface which surrounds said closure wall and which defines a cylindrical conduit extending outward from said closure wall along said axis, said spherical contour of said convex outer side surface having a radius within the range of approximately 40 to approximately 70 percent of the diameter of said surrounding cylindrical surface.

12. Apparatus as defined in claim 11 wherein said radius is approximately 60 percent of said diameter.

13. Apparatus as defined in claim 11 wherein said closure wall has an annular fillet portion defining the periphery of said closure wall, said fillet portion having a concave outer side surface extending radially outward from said convex outer side surface to said surrounding cylindrical surface.

14. Apparatus as defined in claim 13 wherein said convex outer side surface has a first contour, said surrounding cylindrical surface having a second contour, said concave outer side surface having a third contour which is tangent to said first and second contours.

15. Apparatus as defined in claim 14 wherein said third contour has a constant radius.

16. Apparatus as defined in claim 15 wherein said constant radius is not greater than approximately 25 percent of the diameter of said surrounding cylindrical surface.

* * * * *